Patented July 31, 1951

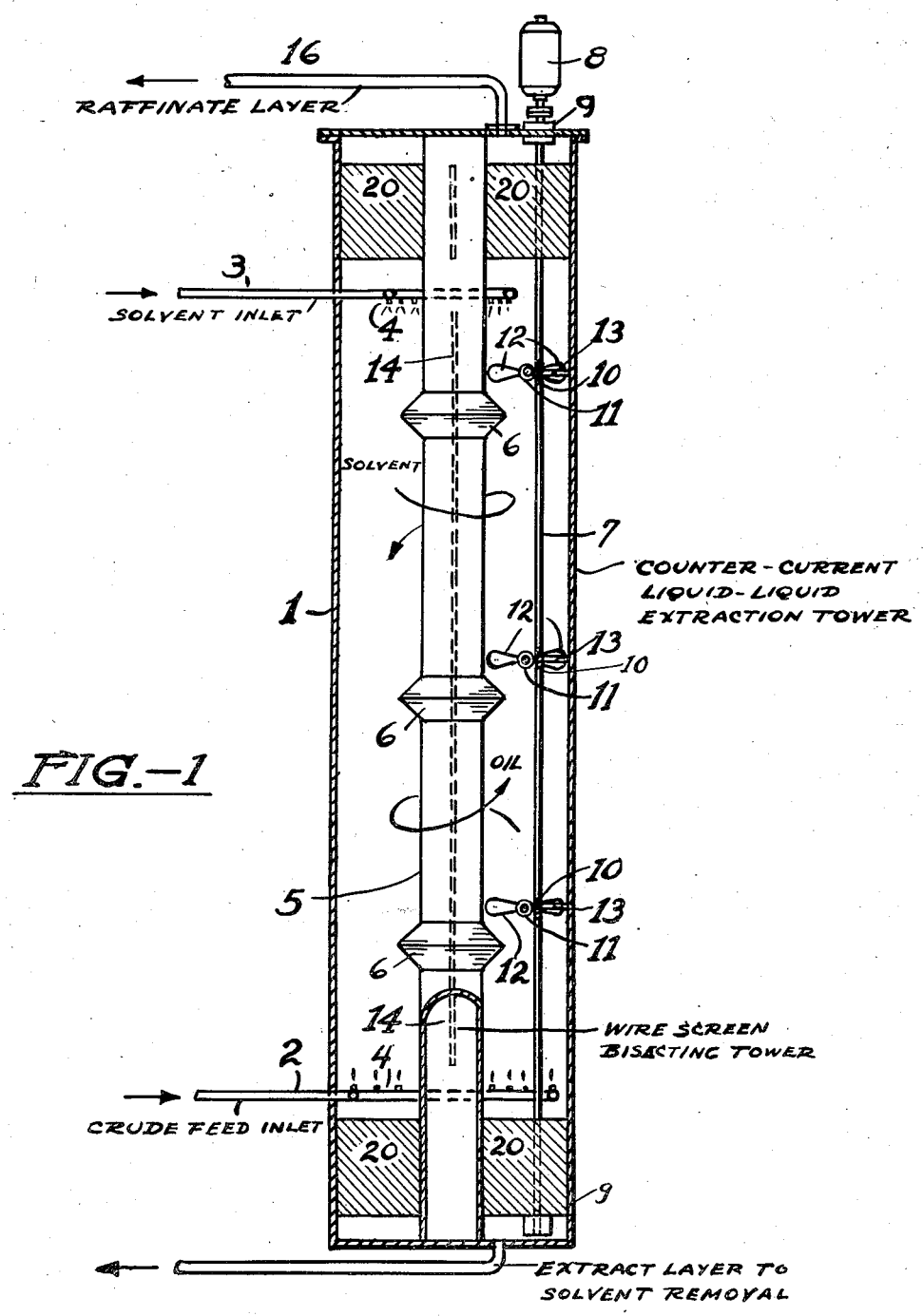

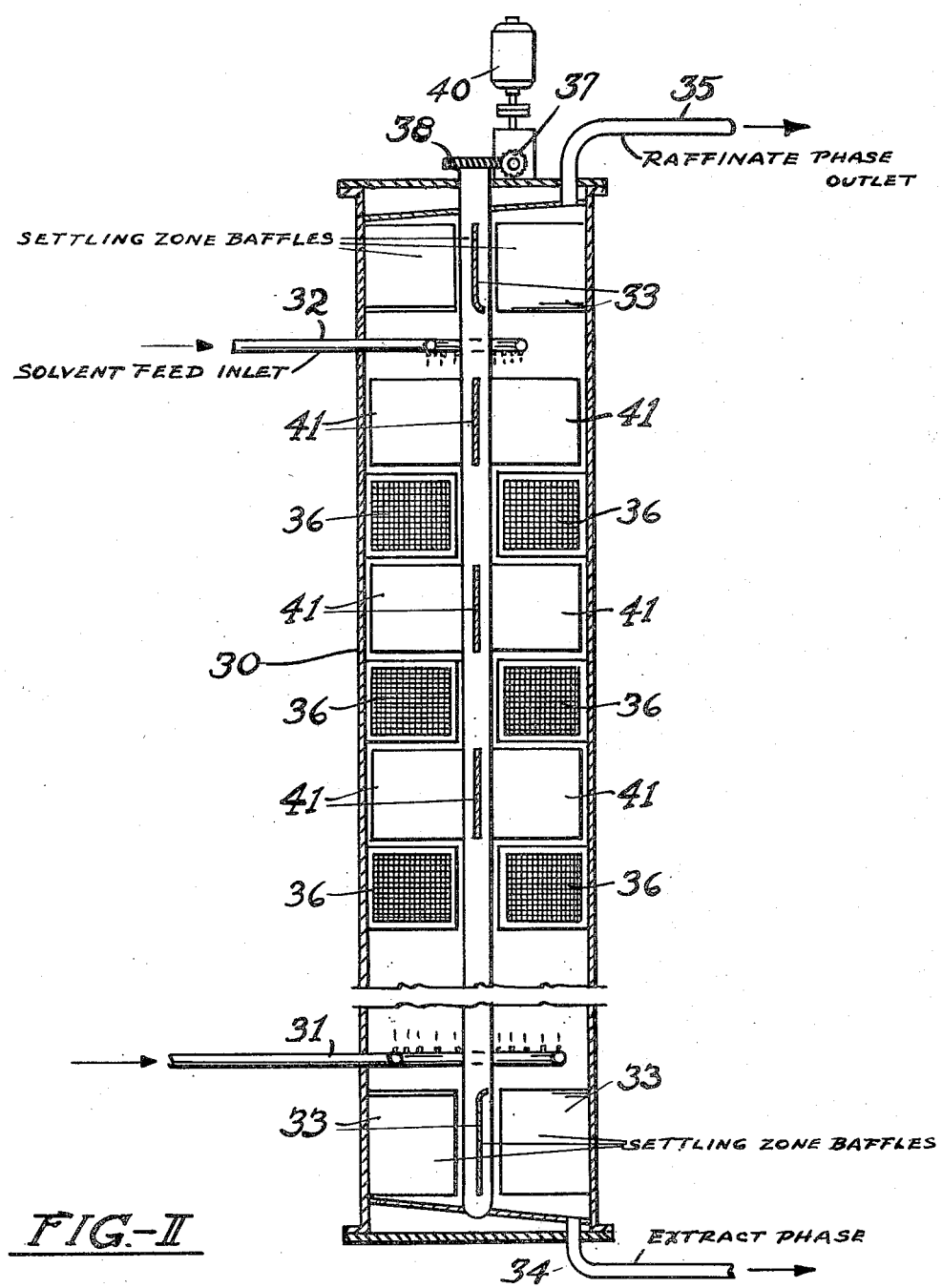

2,562,783

UNITED STATES PATENT OFFICE 2,562,783

COUNTERCURRENT EXTRACTION TOWER

S. George Gallo, Roselle, and Harman V. Hartvigsen, Scotch Plains, N. J., assignors to Standard Oil Development Company, a corporation of Delaware Application November 21, 1947, Serial No. 787,320

7 Claims. (Cl. 196—14.52)

This invention relates to an unpacked liquid-liquid extraction tower in which the total body of liquid being handled is given a continuous rotary motion. Means are also included in the tower to permit redispersion of the dispersed phase at regular intervals.

In a variety of chemical processes, particularly in the petroleum refining industry, it is desirable to contact one liquid with another. In general, liquid contacting systems are referred to as extration processes. One liquid comprising the liquid to be treated is contacted with another liquid which is generally called the solvent. By this means, for example, it is possible to extract desired hydrocarbon constituents from a crude oil.

Various liquid-liquid contacting methods are employed. Contacting may be accomplished in a tower which may or may not be packed. Various baffle elements and agitating means have been suggested. Contacting may be batchwise or continuous, concurrent or countercurrent. The present invention relates to an unpacked countercurrent liquid-liquid tower in which means are employed to continuously rotate the body of liquid in the tower and means are included to periodically redisperse the liquids throughout the tower.

It is a particular object of this invention that the contact time and hence the maximum throughput of the tower may be conveniently adjusted by controlling the rotational rate of the body of fluid. Extremely elastic operation of the tower is thus possible, permitting a given tower to supply the equivalent of widely varied theoretical extraction stages.

It is a further object of this invention that increased extraction efficiency be obtained by periodically redispersing the liquids as they pass through the tower.

A still further advantage of the present invention is that more efficient extraction is attainable than in towers of conventional design. Further objects and advantages of our invention will be appreciated from the following detailed description in connection with the accompanying drawing in which:

Figure I represents an embodiment of our invention wherein a plurality of propellers operated in vertical planes are employed to provide rotary motion of the liquids and in which:

Figure II represents an embodiment of our invention in which a centrally rotated shaft supporting a plurality of baffles is employed to secure rotation of the liquids in the tower.

Referring now to Figure I. One (1) designates a vertical extraction tower. A feed liquid substantially immiscible to be treated may be fed into the bottom of the tower through line 2. A solvent liquid substantially immiscible with the feed liquid, is introduced to the top of the tower through line 3. It is apparent that in the event the solvent liquid is of lesser density than the feed liquid, the points at which these liquids are introduced would be reversed. It is preferred that the lines through which the liquids are introduced terminate within the tower in a series of jets 4. These jets may be inclined in such a manner as to impart helical motion to the liquid being fed into the tower. Thus if the nozzles are horizontally positioned so as to inject the liquid feed tangentially to the walls of the tower a rotational force will be imparted to the liquid. The tendency of the liquid to rise in the tower through the heavier solvent liquid introduced at the top of the tower will impart a vertical force to the feed liquid. Consequently, the horizontal tangential force and the vertical lifting force both applied to the liquid will cause the liquid feed to move helically upward in the tower. This upward helical motion of the liquid is further aided if the nozzles are inclined upwardly. As will be brought out, the helical movement of the liquid feed is further aided by the propellers 12. Rotation of the propellers in a vertical plane applies a force to the liquid feed in the tower, tending to cause the liquid to move rotationally within the tower. Consequently, the tendency of the liquid feed to rise in the tower, coupled with the tendency of the liquid to rotate within the tower, causes the liquid to move in a helical path. It will be noted that the solvent introduced at the top of the tower through line 3 is similarly caused to travel downwardly through the tower in a helical path. Positioned in the center of tower 1 is a cylinder 5. The diameter of the cylinder is not critical but in general the cylinder is sufficiently large that the path of liquid moving helically around the cylinder is not materially less than the path of liquid moving helically along the external walls of the tower. A plurality of double frusto-conical sections 6 joined at their bases, may be positioned on the cylinder 5 for the purpose of counteracting any tendency for the lighter of the two liquids to preferentially move toward the center of the tower. Extending vertically through the tower at a point approximately midway in the annular space formed by the cylinder 5 and the walls of the tower is a rotating axle 7 driven by suitable means such as the electrical motor 8. Suitable packing glands 9 are employed at the top and bottom of the tower to prevent escape of the liquid along the moving shaft. Positioned on this shaft at a plurality of points in the tower are gears 10. The gears 10 serve to drive the gears 11 coupled to the shafts of propellers 12. The gears are so coupled that the propellers 12 are caused to rotate in a vertical plane. Suitable supporting means 13 are employed to rigidly position the propellers in the tower. By virtue of the rotation of the main shaft 7 each of the propellers in the tower is caused to rotate in such a way as to provide rotational movement of the liquid in the tower. Consequently, the solvent being introduced at the top of the tower is caused to have a helical motion downward in the tower. Similarly the feed liquid introduced at the bottom of the tower is caused to have a helical motion upward in the tower. Vertical grids or wire screens 14 are positioned throughout the length of the tower. In general screens of 4–25 mesh are suitable as the choice of screen is not critical. As illustrated two screens are employed lying in the same plane on each side of the central cylinder 5. These screens thus serve to bisect the tower. Screens positioned as indicated serve to cause redispersion of the two liquids forced through the apertures of the screens. By this means as the liquids helically circulate through the tower they are forced through the screens and are thereby redispersed. Positioned at the top and bottom of the tower are a series of baffles 20. These baffles are vertically positioned to prevent rotating of the liquid in the uppermost and lowermost sections of the tower. Consequently, in these sections the baffles will cause settling or separation of the liquid phases. Other means of producing a quiet zone may be preferred such as stationary fan blades or other inclined baffles. An extract layer may thus be removed from the bottom of the tower through line 15 while a raffinate layer may be removed from the top of the tower through line 16.

It will be obvious to those skilled in the art that reflux may be incorporated at either end of the column or both.

It is apparent that in the embodiment of the invention shown in Figure I, the contact time and the maximum throughput of the tower may be conveniently controlled by varying the rate of rotation of the shaft 7 driving the propellers. Thus by imparting a high rate of rotation to the shaft 7 the motion of the liquid in the tower will be that of a tight helix. In this case the contact time will be relatively long and the maximum throughput of the tower will be greatly reduced. When the shaft 7 is given a slower rate of rotation the helical path of the liquid will be correspondingly shortened, giving a lower contact time and a higher maximum throughput. By this means considerable variation in the efficiency of extraction can be effected.

Referring now to Figure II showing another embodiment of our invention, the numeral 30 identifies a vertical extraction tower. Liquid feed is injected into the tower through a series of jets and through line 31 at the bottom of the tower. Similarly the liquid solvent is injected at the top of the tower through line 32. As in the embodiment of Figure I vertical baffles 33 are positioned at the top and bottom sections of the tower to permit separation of the raffinate phase at the top of the tower and the extract phase at the bottom of the tower. As illustrated, the extract phase is removed through line 34 while the raffinate phase is removed through line 35. Affixed to the walls of the tower 30 are a plurality of wire baffles 36. Positioned in the center of the tower is a rotating shaft 37 suitably driven by gears 38, 39 and motor 40. Affixed to the rotating shaft 37 are wire paddles 41. The positioning of the wire baffles 36 and the wire paddles 41 is such that the paddles and baffles lie in successive levels throughout the tower. Relatively small clearances are employed between the paddles and baffles and between the baffles and the central shaft and the paddles and the external walls of the tower. Rotation of the shaft 37 with the wire paddles affixed thereto is effective to impart a rotational motion to the liquid in the tower. The motion of the two streams of liquids is thus of a helical pattern as in the embodiment of Figure I. Similarly the wire baffles are effective in causing periodic redispersion of the liquid in the tower. In all respects, the operation of the embodiment of Figure II is thus similar to the operation of the embodiment of Figure I, particularly as with the former embodiment it is possible to control the contact time by varying the rotational rate of shaft 37. By varying the shaft speed in a typical operation employing the apparatus of Figure II it was found that a four-fold improvement in efficiency was obtained as compared with a packed tower wherein the packing material was ⅛ the column diameter making the comparison on the basis of height equivalent to a theoretical stage.

The embodiment of Figure II is particularly adapted to fabrication in sections. Standard flanged pipe sections may be used having suitable baffles positioned within them. An appropriate number of sections of the flanged pipe may be mounted vertically to give a tower of the desired height.

It is apparent the paddles and baffles may be of any desired design. They may, for example, be of a flat nature as illustrated or may be curved in any desired way. Likewise, the paddles and baffles may be of the same size or may be of different sizes.

As described our invention comprises an unpacked liquid-liquid extraction tower in which a rotational motion is imparted to the liquid in the tower. By means of suitably placed baffles and by virtue of the rotational motion of the liquids in the tower the liquids are redispersed at regular intervals. It is apparent this invention may be greatly modified. For example, the tower may be a jacketed tower permitting operation at high or low temperatures. Again the tower may be utilized for vapor-liquid extractions as well as liquid-liquid extractions.

Having now fully described our invention, we claim:

1. Apparatus for the continuous counter-current contacting of one liquid with another which comprises a vertical tower, radially disposed vertically positioned perforate means within said tower adapted to disperse liquids forced therethrough, means for injecting a light liquid at the bottom of the tower, means for injecting a heavier liquid at the top of the tower, and means for imparting a rotational movement to the said light and heavy liquids contained within the tower, whereby the said heavy liquid will be caused to move helically downward through the tower and the said light liquid will be caused to move helically upward through the tower in a path carrying the said liquids repeatedly through the said perforate means and means at the top and bottom of the tower for respectively withdrawing the light and heavy liquids.

2. A liquid-liquid contacting tower comprising a vertical shell, a cylinder positioned centrally within said shell, propeller means positioned in the annular space between the said cylinder and the said shell rotating in a vertical plane, means to inject a heavy liquid at the top of the said tower, means to inject a light liquid at the bottom of said tower, means to withdraw the heavy liquid from the bottom of the tower, and means to withdraw the light liquid from the top of the tower.

3. The apparatus defined by claim 2 in which a plurality of double frusto-conical sections having their bases joined are positioned around the said hollow cylinder.

4. The apparatus defined by claim 2 wherein at least one perforate member is positioned in the tower extending radially substantially from the cylinder to the shell and extending substantially throughout the vertical height of the tower.

5. A liquid-liquid contacting apparatus consisting of a vertical shell, a rotatable shaft centrally positioned within the said shell, a plurality of paddles fixed to the said shaft, a plurality of fixed vertical perforate baffles fixed to the said shell extending radially inwardly substantially to the said shaft and positioned at different levels within the tower than the said paddles and inlets and outlets at both the top and bottom of the tower for introducing and removing two fluids.

6. Apparatus for the continuous counter-current contacting of one liquid with another which comprises a vertical tower, rotating means within said tower for imparting a rotational movement to liquid contained within said tower and fixed radially extending vertically perforate members positioned on the inside of said tower at a plurality of vertically spaced levels in the tower and inlets and outlets at both the top and bottom of the tower for introducing and removing two fluids.

7. Liquid-liquid contacting apparatus comprising a vertical tower, a rotatable shaft centrally positioned within the said tower, at least one paddle means vertically positioned on said shaft at each of a plurality of spaced points along the shaft, and at least one radially extending perforate member vertically fixed to the shell of the tower at each of a plurality of points along the height of the tower, said paddles and said perforate members being at different levels within the tower and inlets and outlets at both the top and bottom of the tower for introducing and removing two fluids.

S. GEORGE GALLO.
HARMAN V. HARTVIGSEN.

REFERENCES CITED

The following references are of record in the file of this patent:

UNITED STATES PATENTS

| Number | Name | Date |
|---|---|---|
| 1,934,023 | Wright | Nov. 7, 1933 |
| 1,993,446 | Huff | Mar. 5, 1935 |
| 2,072,382 | Robinson | Mar. 2, 1937 |
| 2,205,986 | Mangelsdorf et al. | June 25, 1940 |
| 2,266,521 | Van Dijck | Dec 16, 1941 |
| 2,286,503 | Ocon | June 16, 1942 |